(12) United States Patent
Free et al.

(10) Patent No.: US 9,650,925 B2
(45) Date of Patent: May 16, 2017

(54) SYSTEM AND METHOD OF AUGMENTING LOW OIL PRESSURE IN AN INTERNAL COMBUSTION ENGINE

(75) Inventors: Paul Douglas Free, Hope, IN (US); Kavana Rao, Columbus, IN (US); Michael F. Mattern, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 612 days.

(21) Appl. No.: 13/558,183

(22) Filed: Jul. 25, 2012

(65) Prior Publication Data
US 2014/0032085 A1 Jan. 30, 2014

(51) Int. Cl.
| | |
|---|---|
| *F01M 1/16* | (2006.01) |
| *F01M 1/02* | (2006.01) |
| *F02D 41/04* | (2006.01) |
| *F02D 17/04* | (2006.01) |
| *F01M 1/12* | (2006.01) |
| *B60K 15/03* | (2006.01) |

(52) U.S. Cl.
CPC ............. *F01M 1/16* (2013.01); *F01M 1/02* (2013.01); *F02D 17/04* (2013.01); *F02D 41/042* (2013.01); *B60K 2015/03217* (2013.01); *F01M 2001/0215* (2013.01); *F01M 2001/123* (2013.01); *F16N 2260/50* (2013.01)

(58) Field of Classification Search
CPC . F01M 1/02; F01M 11/02; F01M 1/00; F01M 1/16; F01M 1/18; F01M 1/20; F01M 1/22; F01M 1/24; F01M 2001/0215; F01M 2001/123; F01L 1/344; F02D 45/00; F02D 22/03; F02D 17/04; F02D 41/042; B60K 2015/03217; F16N 2260/50

USPC ............ 701/101, 110, 112, 102; 123/73 AD, 123/65 B, 198 C, 196 R, 196 S, 196 CP; 417/228, 281, 24, 44.1, 45, 44.11, 410.1, 417/318, 341, 343, 508, 31, 282; 73/114.55, 114.56, 114.57
See application file for complete search history.

(56) References Cited

U.S. PATENT DOCUMENTS 3,764,234 A * 10/1973 Morgan ................ F01C 21/045
123/73 V
3,837,430 A 9/1974 Decker et al.
(Continued)

FOREIGN PATENT DOCUMENTS

| CN | 101688449 | 3/2010 |
|---|---|---|
| CN | 104619961 A | 5/2015 |

(Continued)

OTHER PUBLICATIONS

Machine translation of JP2006083782 A; Ono, Tomoyuki; Mar. 2006.*

(Continued)

*Primary Examiner* — Hung Q Nguyen
*Assistant Examiner* — John Bailey
(74) *Attorney, Agent, or Firm* — Faegre Baker Daniels

(57) ABSTRACT

A system and method of providing supplementary oil flow to an oil circuit of an internal combustion engine is described. The primary oil supply is from a mechanical oil pump. The supplementary oil supply is provided using a control system, one or more sensors, and an electrical oil pump. The system is beneficial in circumstances where the mechanical oil pump provides insufficient oil flow, including during engine shutdown.

19 Claims, 2 Drawing Sheets

(56) References Cited

U.S. PATENT DOCUMENTS

| | | | | |
|---|---|---|---|---|
| 4,007,723 A * | 2/1977 | Laughton | F02P 7/10 | 123/146.5 A |
| 4,094,293 A | 6/1978 | Evans | | |
| 4,102,316 A * | 7/1978 | Valbert | F01M 1/24 | 123/196 S |
| 4,124,013 A * | 11/1978 | Rivalto | B60K 15/061 | 123/198 DB |
| 4,153,024 A | 5/1979 | Bertling | | |
| 4,153,124 A * | 5/1979 | Knothe | G01G 1/28 | 177/210 EM |
| 4,168,693 A * | 9/1979 | Harrison | F01M 5/025 | 123/196 S |
| 4,199,950 A * | 4/1980 | Hakanson | F01M 5/00 | 123/179.31 |
| 4,282,836 A * | 8/1981 | Fox | F02P 7/10 | 123/146.5 A |
| 4,293,744 A * | 10/1981 | Kuhn | F02P 7/02 | 200/19.39 |
| 4,302,638 A * | 11/1981 | Fox | F02P 7/021 | 123/146.5 A |
| 4,334,836 A * | 6/1982 | Kubis | F01M 1/02 | 123/195 A |
| 4,411,225 A * | 10/1983 | Dell'Orto | F01M 3/02 | 123/196 R |
| 4,441,866 A * | 4/1984 | Kubis | F01M 1/02 | 417/364 |
| 4,445,470 A * | 5/1984 | Chmielewski | F01M 3/00 | 123/196 S |
| 4,491,103 A * | 1/1985 | Deadman | F01M 11/04 | 123/196 R |
| 4,513,705 A * | 4/1985 | Evans | F01D 25/18 | 123/196 R |
| 4,531,485 A * | 7/1985 | Murther | F01M 1/16 | 123/196 R |
| 4,628,877 A * | 12/1986 | Sundles | F01M 5/02 | 123/179.3 |
| 4,709,785 A | 12/1987 | Csanady, Jr. | | |
| 4,768,480 A * | 9/1988 | Grenn | F02D 37/02 | 123/198 D |
| 4,834,039 A * | 5/1989 | Apostolides | F01M 5/025 | 123/179.1 |
| 4,875,551 A * | 10/1989 | Lulich | F01M 5/025 | 123/179.1 |
| 4,879,981 A * | 11/1989 | Matsumoto | F02B 67/04 | 123/196 R |
| 4,890,695 A | 1/1990 | Morris et al. | | |
| 4,913,108 A * | 4/1990 | Sougawa | F01M 3/00 | 123/196 S |
| 4,940,114 A * | 7/1990 | Albrecht | F01M 1/12 | 123/196 AB |
| 5,000,143 A * | 3/1991 | Brown | F01M 1/12 | 123/196 S |
| 5,014,820 A * | 5/1991 | Evans | F01M 1/20 | 123/196 M |
| 5,085,181 A * | 2/1992 | Feuling | F01L 1/245 | 123/90.12 |
| 5,176,115 A * | 1/1993 | Campion | F02M 57/025 | 123/179.17 |
| 5,195,476 A * | 3/1993 | Schwarz | F01M 5/02 | 123/179.16 |
| 5,474,428 A * | 12/1995 | Kimura | F16H 57/0439 | 192/48.92 |
| 5,501,190 A * | 3/1996 | Okubo | F01M 1/16 | 123/196 M |
| 5,537,959 A * | 7/1996 | Ito | F01M 1/16 | 123/73 AD |
| 5,662,081 A * | 9/1997 | Ng | F01M 3/02 | 123/196 S |
| 5,743,231 A * | 4/1998 | Reinosa | F01M 5/02 | 123/196 S |
| 5,765,521 A * | 6/1998 | Stutzle | F01M 1/12 | 123/196 S |
| 5,884,601 A * | 3/1999 | Robinson | F01M 5/025 | 123/196 A |
| 5,894,825 A * | 4/1999 | Duerr | F01M 1/02 | 123/196 R |
| 5,924,395 A * | 7/1999 | Moriya | B60K 6/46 | 123/179.18 |
| 5,970,942 A * | 10/1999 | Koeberlein | F01M 11/0458 | 123/196 R |
| 6,044,822 A * | 4/2000 | Daniels | F01M 1/02 | 123/196 R |
| 6,148,789 A * | 11/2000 | Johns | F01M 5/025 | 123/196 R |
| 6,234,137 B1 * | 5/2001 | Spriegel | F01M 11/0004 | 123/196 A |
| 6,269,788 B1 * | 8/2001 | Kachelek | F01M 1/16 | 123/196 R |
| 6,350,108 B1 * | 2/2002 | Haupt | F04B 17/03 | 123/196 S |
| 6,390,947 B1 * | 5/2002 | Aoki | B60W 10/06 | 477/156 |
| 6,422,183 B1 * | 7/2002 | Kato | F01M 3/02 | 123/73 AD |
| 6,460,500 B1 * | 10/2002 | Ooyama | F02N 7/00 | 123/179.3 |
| 6,647,326 B2 * | 11/2003 | Nakamori | B60K 6/365 | 477/158 |
| 6,655,342 B1 * | 12/2003 | Wendels | F01M 5/025 | 123/196 R |
| 6,709,362 B2 * | 3/2004 | Tomohiro | B60W 10/30 | 477/20 |
| 6,739,305 B2 * | 5/2004 | Takahara | F01M 1/02 | 123/196 R |
| 6,769,502 B2 * | 8/2004 | Nakamori | B60K 6/365 | 180/65.25 |
| 6,799,109 B2 * | 9/2004 | Nakamori | B60W 10/30 | 475/254 |
| 6,853,954 B2 * | 2/2005 | Apostolides | F01M 1/18 | 702/182 |
| 6,913,558 B2 * | 7/2005 | Mori | B60K 6/485 | 180/65.26 |
| 6,941,922 B2 * | 9/2005 | Williams | F01M 1/02 | 123/196 R |
| 7,001,158 B2 * | 2/2006 | Dunn | F04B 17/046 | 417/38 |
| 7,007,654 B2 * | 3/2006 | Aliev | F01M 5/025 | 123/196 R |
| 7,007,656 B2 * | 3/2006 | Fujino | F01M 1/16 | 123/196 R |
| 7,036,480 B2 * | 5/2006 | Williams | F01M 1/02 | 123/196 R |
| 7,055,486 B2 * | 6/2006 | Hoff | F01M 1/16 | 123/196 R |
| 7,082,918 B2 * | 8/2006 | Rozario | F01L 1/146 | 123/196 R |
| 7,114,482 B2 * | 10/2006 | Lane | F01M 1/02 | 123/196 R |
| 7,137,924 B2 * | 11/2006 | Ito | B60W 10/06 | 477/3 |
| 7,150,286 B2 * | 12/2006 | Apostolides | F01M 11/0408 | 137/14 |
| 7,163,086 B2 * | 1/2007 | Care | F01D 25/20 | 184/6.11 |
| 7,198,020 B1 * | 4/2007 | Beddick | F01M 1/08 | 123/196 R |
| 7,299,780 B1 * | 11/2007 | Thompson | F04B 23/06 | 123/196 R |
| 7,334,557 B2 * | 2/2008 | Callan | F01M 1/18 | 123/196 A |
| 7,350,399 B2 * | 4/2008 | Kobayashi | F02M 25/0818 | 73/49.7 |
| 7,387,189 B2 * | 6/2008 | James | F01D 21/14 | 184/6.11 |
| 7,395,803 B2 * | 7/2008 | Ledger | B60K 6/445 | 123/196 R |
| 7,493,883 B2 * | 2/2009 | Takahashi | F01M 1/18 | 123/196 AB |

(56) References Cited

U.S. PATENT DOCUMENTS

| | | | | |
|---|---|---|---|---|
| 7,506,724 B2 * | 3/2009 | Delaloye | F01D 25/18 | 137/38 |
| 7,516,729 B2 * | 4/2009 | Bedford | F01M 11/064 | 123/196 R |
| 7,546,821 B2 * | 6/2009 | Russell | F01L 13/04 | 123/90.12 |
| 7,610,143 B1 * | 10/2009 | Boesch | B60K 6/365 | 701/112 |
| 7,748,353 B2 * | 7/2010 | Russell | B60K 6/12 | 123/90.12 |
| 7,758,315 B2 * | 7/2010 | Moskun | F04D 15/0209 | 239/68 |
| 7,778,756 B2 * | 8/2010 | Hartwick | B62D 11/003 | 37/348 |
| 7,951,043 B2 * | 5/2011 | Reisch | F16H 57/0434 | 192/113.3 |
| 8,065,986 B2 * | 11/2011 | Sachdev | F01M 5/025 | 123/196 R |
| 8,245,684 B2 * | 8/2012 | Reynolds | F01M 1/16 | 123/196 R |
| 8,905,896 B2 * | 12/2014 | Pietron | B60W 10/023 | 477/168 |
| 8,935,077 B2 * | 1/2015 | Garrard | F01M 1/20 | 123/565 |
| 2002/0019691 A1 * | 2/2002 | Matsubara | B60K 6/48 | 701/54 |
| 2002/0139345 A1 * | 10/2002 | Takahara | F01M 1/02 | 123/196 R |
| 2003/0230274 A1 * | 12/2003 | Williams | F01M 1/02 | 123/196 R |
| 2004/0009075 A1 * | 1/2004 | Meza | F04B 43/0054 | 417/32 |
| 2004/0187833 A1 * | 9/2004 | Lane | F01M 1/02 | 123/196 R |
| 2004/0187835 A1 * | 9/2004 | Hoff | F01M 1/16 | 123/196 R |
| 2005/0028780 A1 * | 2/2005 | Aliev | F01M 5/025 | 123/196 R |
| 2006/0032261 A1 * | 2/2006 | Robinson | F01D 25/125 | 62/331 |
| 2006/0102133 A1 * | 5/2006 | Callan | F01M 1/18 | 123/196 R |
| 2006/0223670 A1 * | 10/2006 | Nishikawa | B60K 6/387 | 477/168 |
| 2006/0289236 A1 * | 12/2006 | Nishino | F01L 1/02 | 184/6.1 |
| 2008/0181790 A1 * | 7/2008 | Meza | F04B 43/0054 | 417/45 |
| 2008/0283337 A1 * | 11/2008 | Theobald | B60K 6/12 | 184/6.1 |
| 2008/0296124 A1 * | 12/2008 | Schiele | F16D 25/123 | 192/85.61 |
| 2009/0000592 A1 | 1/2009 | Luft et al. | | |
| 2009/0025668 A1 * | 1/2009 | Matsusaka | F01L 1/3442 | 123/90.17 |
| 2009/0043476 A1 * | 2/2009 | Saito | B60W 10/26 | 701/102 |
| 2009/0107451 A1 * | 4/2009 | Bochart | F01M 1/16 | 123/196 R |
| 2009/0150059 A1 * | 6/2009 | Santoso | F02D 41/0087 | 701/113 |
| 2009/0232673 A1 * | 9/2009 | Reisch | F16H 57/0434 | 417/364 |
| 2009/0257887 A1 * | 10/2009 | Beattie, Jr. | F16H 61/0031 | 417/14 |
| 2010/0114461 A1 * | 5/2010 | Gibson | F02D 41/0002 | 701/112 |
| 2010/0114462 A1 * | 5/2010 | Gibson | F02D 41/0002 | 701/113 |
| 2010/0143156 A1 * | 6/2010 | Kong | F04B 49/103 | 417/44.1 |
| 2010/0174460 A1 * | 7/2010 | Gibson | B60W 10/026 | 701/54 |
| 2010/0222991 A1 * | 9/2010 | Berr | B60T 7/18 | 701/112 |
| 2010/0229823 A1 * | 9/2010 | Gibson | F01M 1/12 | 123/196 R |
| 2010/0236231 A1 * | 9/2010 | Miyabe | F16H 61/0031 | 60/413 |
| 2010/0242669 A1 * | 9/2010 | Komizo | F16H 57/02 | 74/606 R |
| 2010/0280738 A1 * | 11/2010 | Whitney | F02D 11/105 | 701/102 |
| 2010/0288570 A1 * | 11/2010 | Tarnowsky | B60K 6/485 | 180/65.265 |
| 2010/0293919 A1 * | 11/2010 | Poisson | F01D 19/00 | 60/39.281 |
| 2010/0294231 A1 * | 11/2010 | Kusel | F01M 1/12 | 123/196 R |
| 2010/0318283 A1 * | 12/2010 | Renner | B60P 3/14 | 701/112 |
| 2011/0039657 A1 * | 2/2011 | Gibson | F16H 61/0031 | 477/115 |
| 2011/0077828 A1 * | 3/2011 | Matsuda | F02D 17/00 | 701/54 |
| 2011/0107863 A1 * | 5/2011 | Ren | B60K 6/48 | 74/473.11 |
| 2011/0174250 A1 * | 7/2011 | Borde | F01L 1/24 | 123/90.12 |
| 2012/0123666 A1 * | 5/2012 | Stoffels | F01M 1/02 | 701/113 |
| 2012/0191322 A1 * | 7/2012 | Garrard | F01M 1/20 | 701/103 |
| 2012/0316751 A1 * | 12/2012 | Eastwood | F01M 1/20 | 701/102 |
| 2013/0151113 A1 * | 6/2013 | Chung | F01M 1/16 | 701/102 |
| 2013/0319366 A1 * | 12/2013 | Karasawa | F01M 1/02 | 123/196 R |
| 2013/0327729 A1 * | 12/2013 | Apostolides | F17D 1/14 | 210/805 |
| 2013/0330205 A1 * | 12/2013 | Apostolides | F01M 5/025 | 417/12 |

FOREIGN PATENT DOCUMENTS

| | | | | |
|---|---|---|---|---|
| EP | 1510658 A2 * | 3/2005 | | F01D 21/14 |
| JP | 2000-328922 | 11/2000 | | |
| JP | 2000328922 A * | 11/2000 | | |
| JP | 2001-099282 | 4/2004 | | |
| JP | 2004-218468 A | 8/2004 | | |
| JP | 2006-83782 A | 3/2006 | | |
| JP | 2006083782 A * | 3/2006 | | |
| JP | 2009-167979 A | 7/2009 | | |
| WO | 2014018130 A8 | 2/2015 | | |

OTHER PUBLICATIONS

13558183_Jun. 10, 2015_JP_2006083782_machine translation, Ono, Tomoyuki, Mar. 2006.*
International Search Report and Written Opinion of the International Searching Authority dated Aug. 20, 2013 from corresponding International Application No. PCT/US2013/035637.
Supplemental Search Report dated Apr. 1, 2016 in correspondence EP Application No. 13822361.5.

* cited by examiner

SYSTEM AND METHOD OF AUGMENTING LOW OIL PRESSURE IN AN INTERNAL COMBUSTION ENGINE

TECHNICAL FIELD

This disclosure relates to oil pumps for internal combustion engines and augmenting the oil provided by a mechanical oil pump by selectively engaging an electrically driven oil pump when commanded by a control system.

BACKGROUND

Internal combustion engines require oil for lubrication and cooling. Internal combustion engines have a mechanical oil pump to provide the aforementioned oil. Under some circumstances, the mechanical oil pump may provide insufficient oil pressure for lubricating and cooling the engine, leading to wear and potentially catastrophic failure of the engine. Thus, there exists an opportunity to reduce engine failures by implementing a system and method of providing lubricating and cooling oil to an engine during times when the mechanical oil pump provides insufficient oil pressure.

SUMMARY

This disclosure provides an internal combustion engine comprising an oil circuit and a control system. The oil circuit includes a mechanical oil pump to provide oil flow to the engine and an electrical oil pump. The control system includes a control module and at least one sensor. The control module is adapted to receive a condition signal from the at least one sensor indicative of oil flow in the oil circuit and to provide a control signal to operate the electrical oil pump when the condition signal from the at least one sensor indicates the oil flow from the mechanical oil pump is insufficient to provide adequate lubrication to the internal combustion engine.

This disclosure also provides a method of controlling operation of an oil circuit of an internal combustion engine. The method comprises receiving a condition signal from the at least one sensor indicative of the operating condition of a mechanical oil pump of the oil circuit or indicative of a shutdown condition of the internal combustion engine. The method further comprises analyzing the condition signal to determine whether the operating condition of the mechanical oil pump is adequate for the lubrication needs of the engine. The method also comprises providing a control signal to an electrical oil pump of the oil circuit to operate the electrical oil pump when the operating condition of the mechanical oil pump is inadequate for the lubrication needs of the engine.

This disclosure also provides a method of controlling operation of an oil circuit of an internal combustion engine during shutdown of the engine. The method comprises receiving a condition signal from at least one sensor, analyzing the condition signal to determine that the engine is being shut down, and providing a control signal to an electrical oil pump of the oil circuit to operate the electrical oil pump until shutdown of the engine is complete.

Advantages and features of the embodiments of this disclosure will become more apparent from the following detailed description of exemplary embodiments when viewed in conjunction with the accompanying drawings.

DETAILED DESCRIPTION

Figure 1:
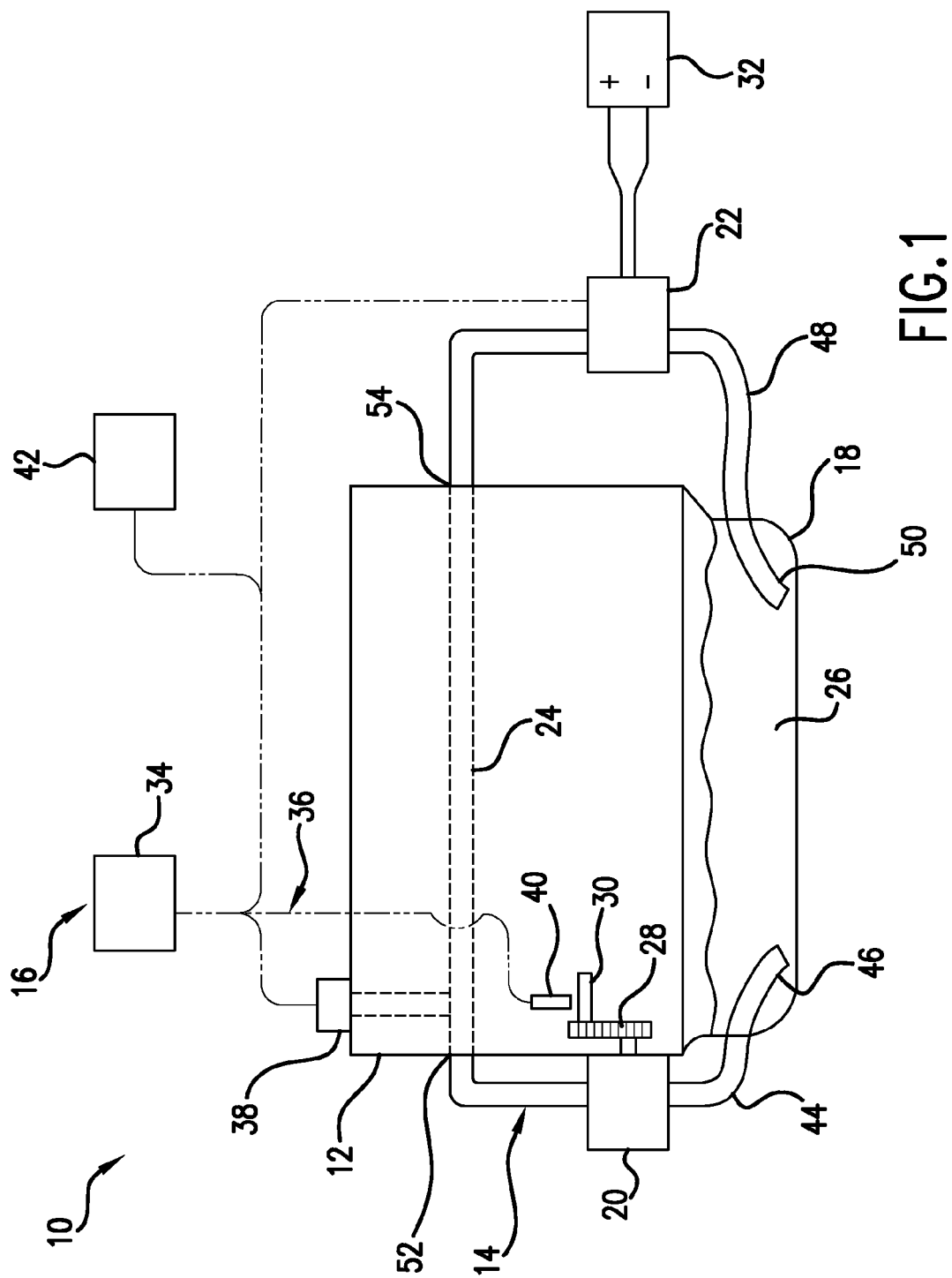
FIG. 1 is a simplified schematic of an exemplary embodiment of the present disclosure.

Referring to FIG. 1, a portion of a conventional internal combustion engine is shown as a simplified schematic and generally indicated at 10. Engine 10 includes an engine body 12, an oil circuit 14, and a control system 16. As will be described hereinbelow, engine 10 includes an improved system of providing oil pressure to lubricate the components of engine 10, particularly under circumstances where a conventional mechanical oil pump of engine 10 is incapable of providing adequate lubricating oil to engine 10. One such circumstance may be during shutdown of engine 10, when a conventional oil pump provides decreasing amounts of lubricating oil as engine 10 slows to a stop. Even though the amount of oil from a conventional oil pump decreases, the need for adequate lubrication continues, leading to a situation where engine 10 may be damaged because a conventional oil pump is incapable of providing sufficient lubricating oil for engine 10. Oil circuit 14 provides adequate lubrication to engine 10 by the use of a control system and an electrical oil pump, as will be seen from the following description.

Oil circuit 14 includes an oil reservoir or pan 18, a mechanical oil pump 20, an electric or electrical oil pump 22, and an oil rifle or rail 24. Oil reservoir 18 includes a supply of lubricating and cooling oil 26. Mechanical oil pump 20 is positioned along oil circuit 14 downstream from oil reservoir 18. Oil rifle 24 is positioned along oil circuit 14 downstream from mechanical oil pump 20. Mechanical oil pump 20 is driven by a chain or gear mechanism 28, which is driven by a shaft 30. Shaft 30 may be a camshaft, distributor shaft, or other rotating component of engine 10 that continuously rotates while engine 10 is operating.

Mechanical oil pump 20 is driven by the rotation of mechanism 28, which is driven by shaft 30. Mechanical oil pump 20 draws lubricating oil 26 from oil reservoir 18, pumping the oil downstream along oil circuit 14 to oil rifle 24. In the exemplary embodiment, mechanical oil pump 20 draws or sucks lubricating oil 26 through a first inlet passage 44, which is submerged at a first suction inlet 46 in lubrication oil 26 located in oil reservoir 18. Mechanical oil pump 20 then provides oil 26 to an entry port at an oil rifle first end 52. Oil rifle 24 includes one or more passages to various components of engine 10, such as shafts, pistons, gears, connecting rods, and the like (not shown). Lubricating oil 26, which also cools the various components of engine 10, splashes on the various components of engine 10. Lubricating oil 26 then returns under the force of gravity to oil reservoir 18.

Electrical oil pump 22 is positioned along oil circuit 14 downstream from oil reservoir 18, and upstream from oil rifle 24 in a location on oil circuit 14 that is in parallel to mechanical oil pump 20. In the exemplary embodiment, electrical oil pump 22 draws lubricating oil 26 through a second inlet passage 48, which is submerged at a second suction inlet 50, and provides oil 26 to an entry port at an oil rifle second end 54. Second suction inlet 50 is a spaced distance from first suction inlet 46. In the exemplary embodiment, the entry port at oil rifle second end 54 is at an opposite end of oil rifle 24 from the entry port at oil rifle first end 52 and thus the entry port at second end 54 is a spaced distance from the entry port at the first end 52. Because mechanical pump 20 and electrical pump 22 each draw oil directly and independently from common oil reservoir 18 via separate parallel inlet passages that are positioned a spaced distance apart, mechanical pump 20 and electrical pump 22 are fluidly positioned along parallel portions of oil circuit 14. Mechanical pump 20 and electrical pump 22 also provide lubricating oil 26 to oil rifle 24 along parallel portions of oil circuit 14.

Electrical oil pump 22 receives electrical power from an electrical power system 32. Electrical oil pump 22 operates when permitted by control system 16, described in more detail hereinbelow. Electrical oil pump 22 draws lubricating oil 26 from oil reservoir 18, pumping lubricating oil 26 downstream to oil rifle 24. Lubricating oil 26 returns to oil reservoir 18 from oil rifle 24 as previously described.

Control system 16 includes a control module 34 and a wire harness 36. Control module 34 may be an electronic control unit or electronic control module (ECM) that monitors conditions of engine 10 and/or an associated vehicle in which engine 10 may be located. Control module 34 may be a single processor, a distributed processor, an electronic equivalent of a processor, or any combination of the aforementioned elements, as well as software, electronic storage, fixed lookup tables and the like. Control module 34 may connect to certain components of engine 10 by wire harness 36, though such connection may be by other means, including a wireless system. For example, control module 34 may connect to electrical oil pump 22. Control module 34 may include a digital or analog circuit.

Control system 16 also includes one or more sensors or inputs that provide condition signals to control module 34. For example, control system 16 may include an oil pressure sensor 38 connected to oil rifle 24 to determine the condition of the oil pressure in oil rifle 24. Control system 16 may include an RPM (Revolutions or Rotations per Minute) sensor 40 positioned to determine the condition of the operating speed of a component of engine 10. In the exemplary embodiment, RPM sensor 40 measures the operating speed of a shaft 30 that directly or indirectly drives mechanical oil pump 20. An operator control panel 42 may also send signals to control system 16 indicative of the operating condition of engine 10. One function of the sensors or inputs is to provide an indication that engine 10 has a deficiency or malfunction that may reduce the output of mechanical oil pump 20 or cause the shutdown of engine 10.

Figure 2:
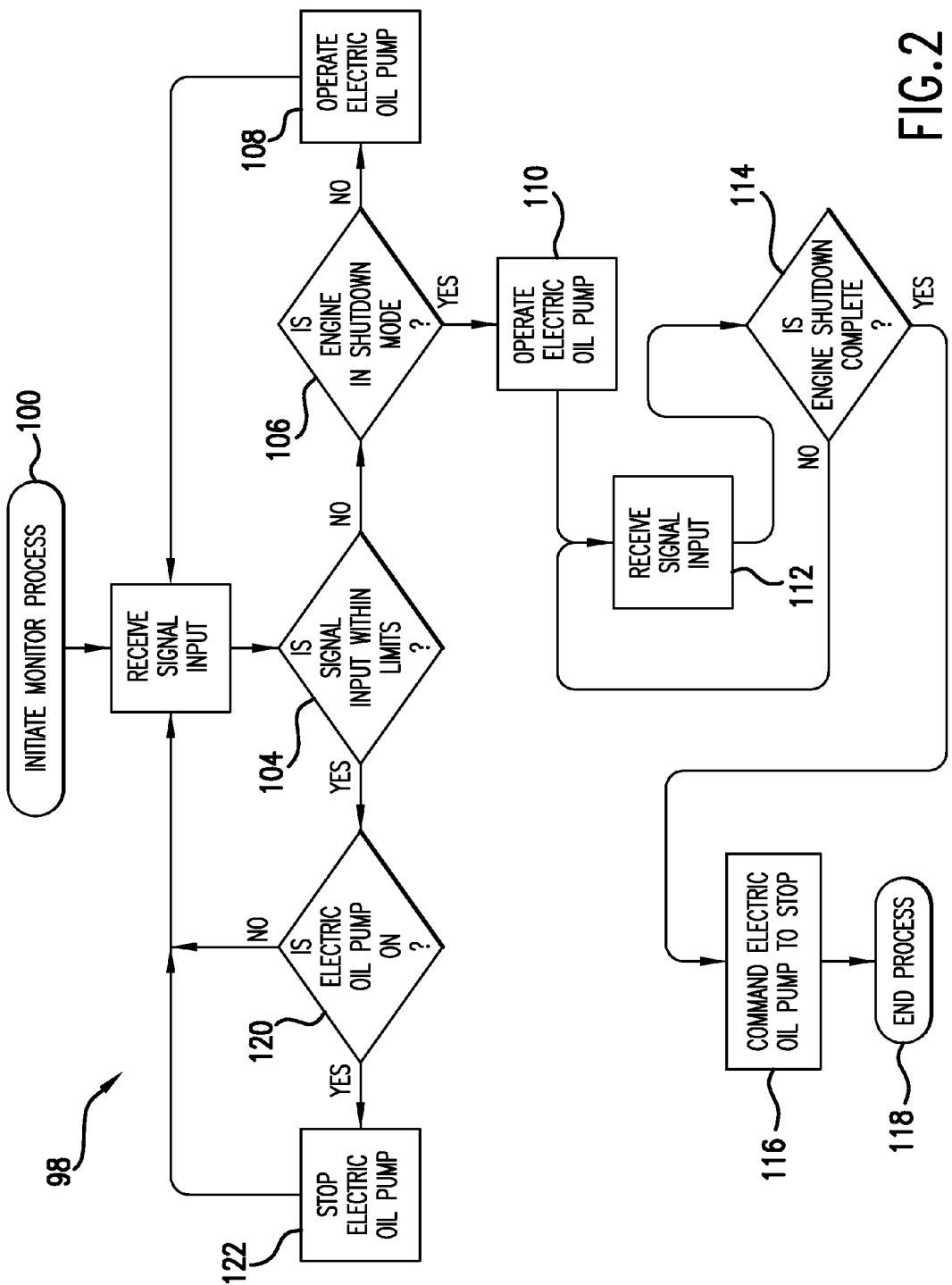
FIG. 2 is a flow chart describing a process of an exemplary embodiment of the present disclosure.

Referring to a flow chart process 98 of FIG. 2, the method of operation of engine 10 is described in more detail. Flow chart process 98 shown in FIG. 2 is part of a larger operating process contained within control module 34. Thus, there are steps that occur prior to step 100 related to the operation of engine 10. Though the process shown in FIG. 2 is shown as self-contained and shows loops that return to a step 102 and a step 112, the process of FIG. 2 may include additional steps, including a return to a calling program, prior to continuing the steps of flow chart process 98. A calling program is a higher-level program, which may be a main or master program, which directs the various sub-processes or subroutines of control system 16. In the exemplary embodiment, at least one or more of the sub-processes or subroutines are located within control module 34.

The process of flow chart 98 begins at a step 100. The process of flow chart 98 may be part of a routine monitoring program, which may therefore be the calling program, for control module 34 that is continuously operated to determine whether the process of flow chart 98 needs implemented. The process continues with step 102, where control module 34 receives input signals from one or more devices. For example, oil pressure sensor 38 may send a signal to control module 34 indicative of the oil pressure in oil rifle 24. RPM sensor 40 may send a signal to control module 34 indicative of the speed of operation of a component of engine 10. For example, RPM sensor 40 may measure the speed of operation of a crankshaft or other component or system of engine 10. In the exemplary embodiment, RPM sensor 40 measures the speed of operation of a shaft 30 that powers or drives mechanical oil pump 20. Operator control panel 42 may send a condition signal to control module 34 indicating that engine 10 is going into a shutdown mode. In the exemplary embodiment, an operator may have commanded engine 10 to shutdown and such command may be entered via operator control panel 42. In another embodiment, other sensor or command inputs may be indicative of engine shutdown, including self-commanded shutdown of engine 10. For example, if the condition signal from oil pressure sensor 38 indicates inadequate lubrication from mechanical oil pump 20, and control module 34 determines that this condition is not transitory, then control module 34 may self-command shutdown of engine 10. In an exemplary embodiment, control module 34 self-commands engine 10 shutdown by sending a control signal to a fueling system (not shown) of engine 10 to cease fueling, which causes engine 10 to stop operating. At the same time that control module 34 sends a signal to a fueling system to cease fueling, control module 34 also sets a condition indicative of engine shutdown that will be used in subsequent steps of process 98. In another example, engine 10 may demand a safety related shutdown and/or may include a fuel volume or level sensor (not shown) that indicates that fuel is about to run out. In order to prevent possible damage to various systems of engine 10, a control system of engine 10 or control system 16 may decide to perform a controlled self-commanded shutdown of engine 10 in advance of running out of fuel. Thus, there may be signal inputs from other locations in engine 10 and/or an associated vehicle that are indicative of engine shutdown that may be received at step 102.

The process moves to a decision step 104. At decision step 104, the signal received from one or more components or devices is analyzed or compared with predetermined limits. For example, a signal from pressure sensor 38 may be compared with a minimum predetermined oil pressure considered necessary for proper lubrication of engine 10. A signal from RPM sensor 40 may be compared to a minimum predetermined RPM. A signal from operator control panel 42 may be evaluated to determine whether engine 10 is in a shutdown mode. If the signals received from oil pressure sensor 38 or from RPM sensor 40 are below minimum predetermined limits, or if engine 10 is in a shutdown mode, which includes a self-commanded shutdown mode, then control passes to step 106. Otherwise, control passes to step 120.

At decision step 120, a determination of whether electrical pump 22 is operating is made. If electrical pump 22 is not operating, the process returns to step 102 where additional signal inputs are received. If electrical pump 22 is operating, then the process moves to step 122. At step 122, electrical pump 22 is commanded to cease operation since control system 16 has determined that the supply of oil from mechanical oil pump 20 is adequate for lubrication and/or cooling of engine 10. The process then returns to process step 102.

Returning now to decision step 106, the process determines whether the engine is in a shutdown mode. Such determination may be made by one of several methods. For example, the signal from RPM sensor 40 may drop continuously over multiple signal input cycles, indicating that engine 10 is shutting down or stopping. A decreasing pressure signal from oil pressure sensor 38 over several signal input cycles might be treated as an indication that engine 10 is in a shutdown mode. The signal from operator control panel 42 may indicate that an operator is commanding engine 10 to shut down. Process 98 may have received a condition signal from control system 16 indicative of a self-commanded engine 10 shut down. In each case, control passes to step 110. If process 98 is unable to determine that engine 10 is in a shutdown mode, control passes to a step 108.

At step 108, control module 34 commands electric pump 22 to operate, because one or more signals received from oil pressure sensor 38, RPM sensor 40, or other sensors (not shown) is indicative of the operating condition of engine 10 being outside limits that are appropriate for a sufficient supply of lubricating oil 26 to oil rifle 24. Mechanical pump 20 continues to operate and continues to provide oil flow to oil rifle or rail 24. If electrical oil pump 22 is already operating, it continues to operate. Process 98 now returns to step 102 to obtain more sensor input to determine whether the electrical pump needs to continue to operate based on a continuing condition or other conditions to avoid excessive wear, engine damage, etc.

Returning now to step 110, electrical oil pump 22 is commanded by control module 34 to operate because control module 34 has determined that engine 10 is in a shutdown mode of operation. Mechanical pump 20 continues to operate and continues to provide oil flow to oil rifle or rail 24. If electrical oil pump 22 is already operating because it was previously commanded to operate, for example by a command at step 108, it continues to operate. Process 98 continues with a step 112, where control module receives a sensor or signal input from one or more sensors. Process 98 then continues with a decision step 114, where a determination of whether shutdown of engine 10 is complete. For example, control module 34 may receive a signal from RPM sensor 40 that engine 10 RPM is at zero, which is indicative of engine stop. Though not shown, control module 34 may receive signals from other portions of engine 10 indicative of engine shutdown, for example, pressure sensors indicating operation of a turbocharger, RPM sensors from other locations in engine 10, or flow rate sensors indicating intake or exhaust gas flow. In another embodiment, an engine stopped signal may be sent to control module 34, which step 114 may use to determine that engine shutdown is complete. If shutdown of engine 10 is not complete, control returns to step 112, where additional signals are received from the sensors of engine 10. If engine shutdown is complete, control passes to a step 116, where operation of electrical oil pump 22 is stopped. Control then passes to a step 118, which terminates process 98.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
   an oil circuit including at least one passage to provide oil flow to at least one component of the internal combustion engine, a mechanical oil pump connected to the at least one passage to provide oil flow to the at least one passage, and an electrical oil pump connected to the at least one passage to provide oil flow to the at least one passage; and
   a control system including a control module and at least one sensor, the at least one sensor connected to the at least one passage of the oil circuit to measure an oil pressure in the at least one passage and to provide an oil pressure value indicative of a current oil pressure value in the at least one passage, wherein the current oil pressure value is a value within a range of oil pressure values generated in response to the oil pressure, the control module structured to:
   receive the oil pressure value;
   in response to the oil pressure value, determine a non-transitory self-shutdown condition wherein the oil pressure is less than a predetermined minimum oil pressure and is non-transitory; and
   in response to the self-shutdown condition, operate the electrical oil pump.

2. The internal combustion engine of claim 1, wherein the control module is further structured to operate the electrical oil pump in response to a fuel level indicating that fuel is about to run out.

3. The internal combustion engine of claim 1, wherein the control module is further structured to stop the engine in response to the self-shutdown condition.

4. The internal combustion engine of claim 1, wherein the control system includes a revolutions per minute (RPM) sensor.

5. The internal combustion engine of claim 4, wherein the RPM sensor measures the speed of operation of the mechanical oil pump and provides an RPM measurement, the control module further structured to determine the self-shutdown condition in response to the RPM measurement being less than a predetermined minimum RPM.

6. The internal combustion engine of claim 1, wherein the at least one sensor further includes an operator control panel, and a condition signal from the operator control panel is indicative of a command to shut the engine down.

7. The internal combustion engine of claim 1, wherein the mechanical oil pump and the electrical oil pump are fluidly connected in parallel.

8. The internal combustion engine of claim 4, wherein the electrical oil pump operates until engine shutdown is complete and the RPM measurement indicates zero RPM.

9. A method of controlling operation of an oil circuit of an internal combustion engine during shutdown of the engine, the method comprising:
   receiving a condition signal from at least one sensor indicative of oil pressure in the oil circuit wherein the condition signal is a pressure value within a range of oil pressure values received from the at least one sensor;
   analyzing the condition signal to determine a non-transitory condition that the oil pressure is below a predetermined limit and is non-transitory; and
   in a response to the non-transitory condition, providing a shutdown signal to the engine and operating an electrical oil pump of the oil circuit until shutdown of the engine is complete.

10. The method of claim 9, wherein the at least one sensor is an oil pressure sensor positioned along the oil circuit downstream from a mechanical oil pump.

11. The method of claim 10, further comprising analyzing a revolutions per minute (RPM) measurement and the pressure value to determine whether an operating condition of the mechanical oil pump is adequate for the lubrication needs of the engine and whether the operating condition is non-transitory.

12. The method of claim 11, wherein the RPM measurement indicates a speed of a shaft that drives the mechanical oil pump.

13. The method of claim 10, wherein the mechanical ml pump and the electrical oil pump are connected in parallel.

14. The method of claim 9, further comprising stopping the engine in response to the condition signal indicating inadequate oil flow for the lubrication needs of the engine and not being transitory.

15. The method of claim 11, further comprising operating the electrical oil pump until engine shutdown is complete and the RPM measurement indicates zero RPM.

16. The method of claim 9, wherein the at least one sensor includes an RPM sensor.

17. The method of claim 16, further comprising measuring a speed of operation of the mechanical oil pump by the RPM sensor.

18. The method of claim 9, further comprising receiving a condition signal from an operator control panel indicative of a command to shut the engine down, wherein the at least one sensor includes the operator control panel.

19. The method of claim 9, further comprising providing a shutdown signal to the engine and operating the electrical oil pump in response to a fuel level indicating that fuel is about to run out.

* * * * *